United States Patent [19]

Rinke

[11] Patent Number: 5,251,007
[45] Date of Patent: Oct. 5, 1993

[54] DUAL-BEAM SPECTROMETER

[75] Inventor: Günter Rinke, Weingarten, Fed. Rep. of Germany

[73] Assignees: Kernforschungszentrum Karlsruhe GmbH, Karlsruhe; Bernath Atomic GmbH & Co. KG, Wennigsen, both of Fed. Rep. of Germany

[21] Appl. No.: 720,757
[22] PCT Filed: Nov. 19, 1990
[86] PCT No.: PCT/DE90/00887
 § 371 Date: Jul. 1, 1991
 § 102(e) Date: Jul. 1, 1991
[87] PCT Pub. No.: WO91/08454
 PCT Pub. Date: Jun. 13, 1991

[30] Foreign Application Priority Data

Nov. 27, 1989 [DE] Fed. Rep. of Germany ....... 3939148

[51] Int. Cl.$^5$ ............................................. G01J 3/42
[52] U.S. Cl. ...................................... 356/319; 356/334
[58] Field of Search ........ 356/319, 326, 328, 330-334, 356/305, 320-321, 325, 316, 72, 309, 411

[56] References Cited

U.S. PATENT DOCUMENTS 4,458,323 7/1984 Willis et al.
4,669,873 6/1987 Wirz.

FOREIGN PATENT DOCUMENTS 0340915 11/1989 European Pat. Off.
2656119 6/1977 Fed. Rep. of Germany.

OTHER PUBLICATIONS

"Simultaneous Dual-Window Measurements with a Linear Photo-diode Array Detector" Zhvetal, Applied Spectroscopy, vol. 42, #8, 1988.
Pat. Abst. of Japan; 12, Nr. 483; Dec. 16, 1988.
Pat. Abst. of Japan; 3; Nr. 145; Nov. 30, 1979.
Applied Spectroscopy, Band 42, Nr. 8, Dec. 1988 J. Zhu et al.
Labor Praxis Spezial 1988, Steinwand; pp. 90-92.

Primary Examiner—Vincent P. McGraw
Assistant Examiner—K. P. Hantis
Attorney, Agent, or Firm—Spencer, Frank & Schneider

[57] ABSTRACT

The invention relates to a dual-beam spectrometer in which a measuring beam, after passage through a measuring cell, and a reference beam each travel through an entrance slit into a spectrometer. Both beams are spectrally separated by means of an optical grating. The spectrometer is intended to operate with a single photodiode array. According to the invention, the two entrance slits, the center of the grating and the measuring and reference spectra lie in one plane; both spectra are recorded on a single detector array, with the spectrum of the measuring beam of the +1 order directly following the spectrum of the reference beam of the −1 order.

3 Claims, 1 Drawing Sheet

DUAL-BEAM SPECTROMETER

BACKGROUND OF THE INVENTION

The invention relates to a dual-beam spectrometer according to the preamble of the patent claim. Such a spectrometer is composed of at least two entrance slits, a diffraction grating, at least one photodiode array as the optical detector and a collimation lens system. However, the collimation function may also be taken over by a concave grating. Customarily, a holographic concave grating whose diffraction spectrum lies in one plane is employed for this purpose.

Such measuring instruments, called spectral photometers, spectral spectrometers or also array spectrometers are employed in laboratory analysis and in the process measuring art. They can be used to continuously measure gases and liquids, for example, in order to monitor the emission of noxious gases in the exhaust gas of a power plant operated with fossil energy carriers.

Another field of use is high performance liquid chromatography (HPLC), in which the liquid substance mixtures to be examined are split successively in time into their chemical components in a separating column and are converted into electrical signals by a UV-HPLC detector. Such a UV-HPLC detector is composed of a source of ultraviolet light, a flow-through cuvette, a spectrometer and at least one detector array. The division into a measuring beam path and a reference beam path required because of the poor stability of the UV lamp is realized by means of a beam divider.

The periodical Labor Praxis [Laboratory Practice], October, 1988, pages 1091-1094, and the data sheet put out by Milton Roy report of a diode array spectrophotometer "Spectronic 3000 Array" which has two entrance slits, a grating and an array. However, this arrangement is not a dual-beam spectrometer since the two slits do not serve as a measuring slit and a reference slit, respectively. Rather, they permit different wavelengths, visible light and ultraviolet light, to enter the spectrometer separately to then be imaged in succession on one array. The detection of fast light source instabilities is not possible with this system.

Additionally, the periodical Labor Praxis Spezial [Laboratory Practice Special], 1988, pages 90-92, and the data sheet put out by Perkin-Elmer report of an "LC-235" diode array. This system is composed of two superposed entrance slits, a grating and two likewise superposed photodiode arrays. In this way, it is possible to eliminate even very fast lamp fluctuations.

The Proceedings of SPIE, 1988, Vol. 1013, pages 146-153, also describe a spectrometer having several entrance slits which, however, are also superposed on one another so that several arrays must be employed at the output.

U.S. Pat. No. 4,669,873 discloses a spectrophotometer having three entrance slits, a grating and an array. However, with this arrangement only one measuring beam at a time can be analyzed since only one entrance slit is illuminated for a certain period of time.

Of the foregoing measuring systems, those that are able to simultaneously record a measuring spectrum and a reference spectrum and have the entrance slits arranged above one another, employ at least two photodiode arrays or dual-photodiode arrays in which two arrays are accommodated in one housing.

These solutions have the drawback that a stigmatic spectrometer is required for the necessary dot-wise reproduction. Additionally it is necessary to employ a complicated system for separating and coupling the beams into the spectrometer and for separately imaging the beams on the arrays. Such an arrangement is expensive, particularly if dual photodiode arrays are employed.

SUMMARY OF THE INVENTION

It is an object of the invention to replace the two photodiode arrays by a single array. Additionally, the entrance slits are to be clearly separated from one another in order to make the expensive beam separation superfluous.

This is accomplished according to the invention by a dual-beam spectrometer including: a lamp for generating a beam of light; a beam divider disposed for dividing the beam of light from the lamp into a measuring beam and a reference beam; an optical deflection system for deflecting the reference beam; a measuring cell through which the measuring beam passes; and a spectrometer comprising: a first entrance slit which permits the measuring beam, once it has passed through the measuring cell, to enter the spectrometer; a second entrance slit, arranged separately from the first entrance slit, which permits the reference beam to enter into the spectrometer; an optical grating having a center point and disposed for spectrally separating the measuring beam and the reference beam to form respective spectra of the measuring and reference beams, wherein the first and second entrance slits, the center point of the grating, and the spectra of the measuring beam and of the reference beam lie in a common plane; and a single detector array on which the spectra of the measuring beam and of the reference beam are imaged for simultaneously recording the spectra of the measuring beam and of the reference beam, wherein the first and second entrance slits are arranged at respective angles relative to the grating normal so that the spectrum of the measuring beam of the +1 order immediately follows, in an inverse direction, the spectrum of the reference beam of the −1 order.

Thus, by selection of the angles between the entrance slits and the grating, the spectra are imaged in the opposite sense on a single array.

Thus, a single array and a simpler electronic system can be employed. The measuring arrangement according to the invention permits, in particular, the use of a pulsed xenon lamp. Preferred are the wavelengths from 200 nm to 400 nm.

The calculation of all required angles will be described with reference to an exemplary embodiment. It is assumed that it is intended to cover the wavelength range from 190 nm to 350 nm by means of a photodiode array composed of 1024 elements and having a length of 25.4 mm. For example, a concave grating having a focal length of 190 mm and 360 lines per millimeter can be employed as the grating. For an incidence angle of −3.942°, this grating is able to produce a spectrum in one plane. The known grating equation is utilized for the optimum calculation of the angles, with the signs of the angles indicating the direction of rotation:

$$\sin \alpha + \sin \beta = nk1$$

where
  $\alpha$: the angle of incidence between the entrance slit and the grating normal;

$\beta$: the exit angle between the grating normal and the exit slit;
n: the order of the grating (0, ±1, ±2, ...);
k: the number of lines per millimeter;
l: the wavelength.

With this equation, the above grating data and the required wavelength range, the necessary angles are fixed. For the orders of +1 and −1 and an angle of incidence for the second entrance slit of −11.83°, for example, the following spectrum end points result:

$\beta(ES_1, n_{+1}, 190nm) = +7.88°$ $\beta(ES_1, n_{+1}, 350nm) = +11.23°$ $\beta(ES_1, n_{-1}, 190nm) = +0.02°$ $\beta(ES_1, n_{-1}, 350nm) = -3.28°$ $\beta(ES_2, n_{+1}, 190nm) = +15.87°$ $\beta(ES_2, n_{+1}, 350nm) = +19.33°$ $\beta(ES_2, n_{-1}, 190nm) = +7.85°$ $\beta(ES_2, n_{-1}, 350nm) = +4.53°$ The parameters in parentheses indicate the number of the entrance slit, the order and the wavelength.

These values clearly indicate that the spectrum of entrance slit 1 of the order +1 lies directly next to the spectrum of entrance slit 2 of the order of −1 in the inverse direction and both spectra together sweep an angular range from 11.23° to 4.53°=6.7°. With a focal width of 190 mm, this corresponds to approximately 22.5 mm so that both spectra fit onto an array of a length of 25 mm.

For other gratings the general calculation of all angles can be made analogous to this example. In this case, it is a condition for the entrance angle of the second entrance slit that the spectrum of this entrance slit follow precisely that of the first entrance slit. The grating itself must be selected on the basis of the desired dispersion and the blaze angle.

BRIEF DESCRIPTION OF THE DRAWINGS

The invention will now be described in greater detail with reference to a further embodiment thereof and drawing FIGS. 1 and 2 wherein.

DESCRIPTION OF THE PREFERRED EMBODIMENT

Figure 1:
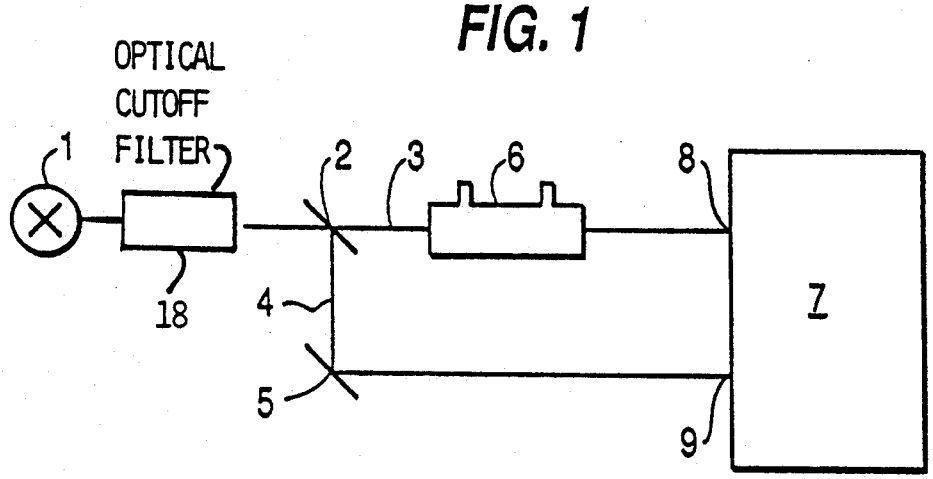
FIG. 1 is a block circuit diagram showing a generalized arrangement of a dual-beam spectrometer.

FIG. 1 is a schematic representation of a dual-beam spectrometer including a light source 1, a beam divider 2 which produces a measuring beam 3 and a reference beam 4, an optical deflection system 5, a measuring cell 6 and a spectrometer 7 which has a first entrance slit 8 for the measuring beam 3 and a second entrance slit 9 for the reference beam 4.

Figure 2:
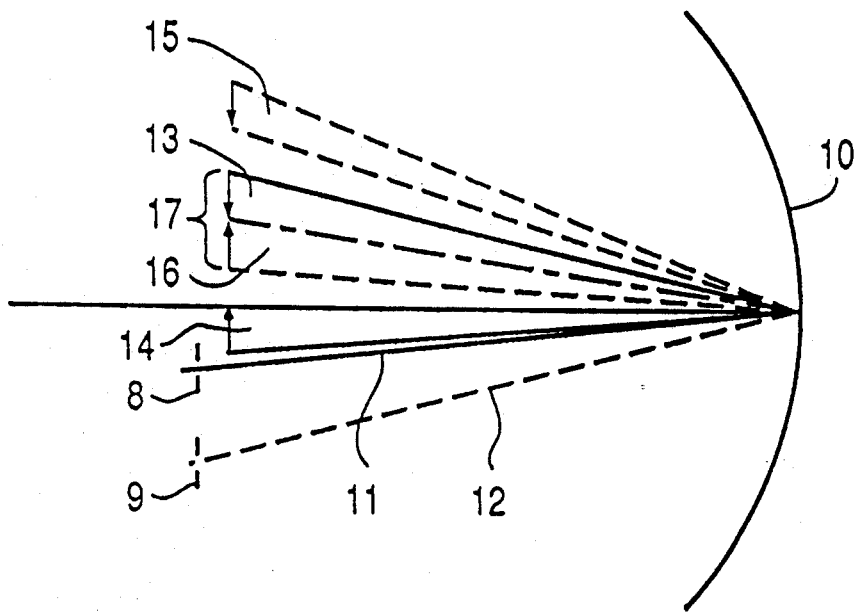
FIG. 2 is a diagram illustrating an arrangement according to the invention.

FIG. 2 shows the arrangement according to the invention. Measuring beam 3 travels through entrance slit 8 as beam 11 into spectrometer 7 onto concave grating 10 and is there separated into a spectrum 13 of the order of +1 and a spectrum 14 of the order of −1. Analogously, the reference beam 4 travels through entrance slit 9 as beam 12 into spectrometer 7 onto concave grating 10 and is there separated into a spectrum 16 of the order of −1 and a spectrum 15 of the order of +1. The drawn-in arrows indicate the direction of the spectrum, with the tip of the arrow corresponding to a wavelength of 190 nm and the end of the arrow corresponding to a wavelength of 350 nm. It should be especially noted that the two spectra 13 and 1 6 are imaged in opposite directions on one array 17. An overlap in the center, corresponding to wavelengths less than 190 nm, is here not possible since the latter are absorbed in the air. The higher grating orders also do not interfere as long as the measuring range is not broadened to beyond 380 nm.

Compared to dual-beam spectrometers having two arrays, the dual beam spectrometer according to the invention has the following advantages:

only one array and one grating are required;
less expenses for electronic equipment (a preamplifier, an A/D converter);
no differences in behavior of measuring and reference channel due to the drifting of two amplifiers or A/D converters or due to differences between two arrays;
no stigmatically imaged grating is required;
well separated entrance slits, therefore easy beam division is possible.

The arrangement shown here, which includes a concave grating whose diffraction spectrum lies in one plane, is only one possibility for realizing the method. Another possibility is, for example, to employ a plane grating and a corresponding optical collimation system, e.g. in a Czerny-Turner arrangement. In that case, the angle calculations are the same, care must merely be taken that a flat spectrum results. This can be realized by selecting the distances between the optical components and is known in the art.

A modification for greater wavelengths, in which it is to be expected that the spectra overlap in the center of the array, resides in the additional use of an optical cutoff filter. This filter must be able to absorb those wavelengths which are smaller than the shortest wavelength to be covered. An optical cutoff filter 18 may advantageously be disposed between light source 1 and beam divider 2 as shown in FIG. 1.

I claim:

1. A dual-beam spectrometer comprising:
   a lamp for generating a beam of light;
   a beam divider disposed for dividing the beam of light from said lamp into a measuring beam and a reference beam;
   an optical deflection system for deflecting the reference beam;
   a measuring cell through which the measuring beam passes; and
   a spectrometer comprising:
      a first entrance slit which permits the measuring beam, once it has passed through the measuring cell, to enter the spectrometer;
      a second entrance slit, arranged separately from said first entrance slit, which permits the reference beam to enter into the spectrometer;
      an optical grating having a center point and disposed for spectrally separating the measuring beam and the reference beam to form respective spectra of said measuring and reference beams, wherin said first and second entrance slits, the center point of said grating, and the spectra of the measuring beam and of the reference beam lie in a common plane; and a single detector array on which the spectra of the measuring beam and of the reference beam are imaged for simultaneously recording the spectra of the measuring beam and of the reference beam, wherein said first and second entrance slits are arranged at respective angles relative to the grating normal so that the spectrum of the measuring beam of the +1 order immediately follows, in an inverse direction, the spectrum of the reference beam of the −1 order.

2. A dual-beam spectrometer according to claim 1, wherein said optical grating comprises a concave grating having a diffraction spectrum disposed in the common plane.

3. A dual-beam spectrometer according to claim 1, and further comprising a cutoff filter disposed between said lamp and said beam divider for absorbing all wavelengths of light emanating from said lamp which are less than the shortest wavelength to be covered.

* * * * *